United States Patent
Muquet

(10) Patent No.: US 10,362,556 B2
(45) Date of Patent: Jul. 23, 2019

(54) MESSAGING SCHEME FOR POSITIONING

(71) Applicant: Sequans Communications S.A., Colombes (FR)

(72) Inventor: Bertrand Muquet, Colombes (FR)

(73) Assignee: Sequans Communications S.A., Colombes (FR)

( * ) Notice: Subject to any disclaimer, the term of this patent is extended or adjusted under 35 U.S.C. 154(b) by 0 days.

(21) Appl. No.: 15/476,591

(22) Filed: Mar. 31, 2017

(65) Prior Publication Data

US 2017/0289952 A1 Oct. 5, 2017

(30) Foreign Application Priority Data

Mar. 31, 2016 (EP) .................................... 16305385

(51) Int. Cl.
| | | |
|---|---|---|
| *H04W 64/00* | (2009.01) | |
| *G01S 19/05* | (2010.01) | |
| *G01S 5/02* | (2010.01) | |
| *G01S 19/08* | (2010.01) | |
| *H04J 11/00* | (2006.01) | |
| *H04W 48/10* | (2009.01) | |

(52) U.S. Cl.
CPC ......... *H04W 64/006* (2013.01); *G01S 5/0236* (2013.01); *G01S 19/05* (2013.01); *G01S 19/08* (2013.01); *H04J 11/0079* (2013.01); *H04J 11/0093* (2013.01); *H04W 48/10* (2013.01)

(58) Field of Classification Search
CPC ... H04W 64/006; H04W 48/10; G01S 5/0236; G01S 19/05; G01S 19/08; H04J 11/0079; H04J 11/0093
See application file for complete search history.

(56) References Cited

U.S. PATENT DOCUMENTS

| | | | |
|---|---|---|---|
| 9,699,758 B2* | 7/2017 | Edge ....................... | H04W 4/06 |
| 2010/0013702 A1* | 1/2010 | Lin ......................... | G01S 19/05 |
| | | | 342/357.43 |
| 2011/0148700 A1* | 6/2011 | Lasagabaster .......... | G01S 19/25 |
| | | | 342/357.64 |
| 2014/0087759 A1* | 3/2014 | Blumstein ............. | H04W 4/025 |
| | | | 455/456.2 |
| 2014/0176366 A1 | 6/2014 | Fischer et al. | |
| 2016/0029162 A1* | 1/2016 | Edge ....................... | H04W 4/06 |
| | | | 455/456.1 |
| 2016/0234645 A1* | 8/2016 | Belghoul ................ | G01C 5/06 |

FOREIGN PATENT DOCUMENTS

| | | |
|---|---|---|
| EP | 1564564 A2 | 8/2005 |
| WO | 2011128504 A1 | 10/2011 |
| WO | 2012108808 A1 | 8/2012 |
| WO | 2013033464 A2 | 3/2013 |

OTHER PUBLICATIONS

The Extended European Search Report for EP Application No. 16305385.3 dated Sep. 13, 2016.

* cited by examiner

*Primary Examiner* — Khai M Nguyen
(74) *Attorney, Agent, or Firm* — Hamilton, Brook, Smith & Reynolds, P.C.

(57) ABSTRACT

A method of providing position assistance to a UE, the method comprising providing, by a location server, at least one unsolicited message, each message comprising one of data selected from a list comprising GNSS ephemeris assistance data, GNSS acquisition assistance data, OTDOA assistance data and eNB position data for a predefined area.

18 Claims, 5 Drawing Sheets

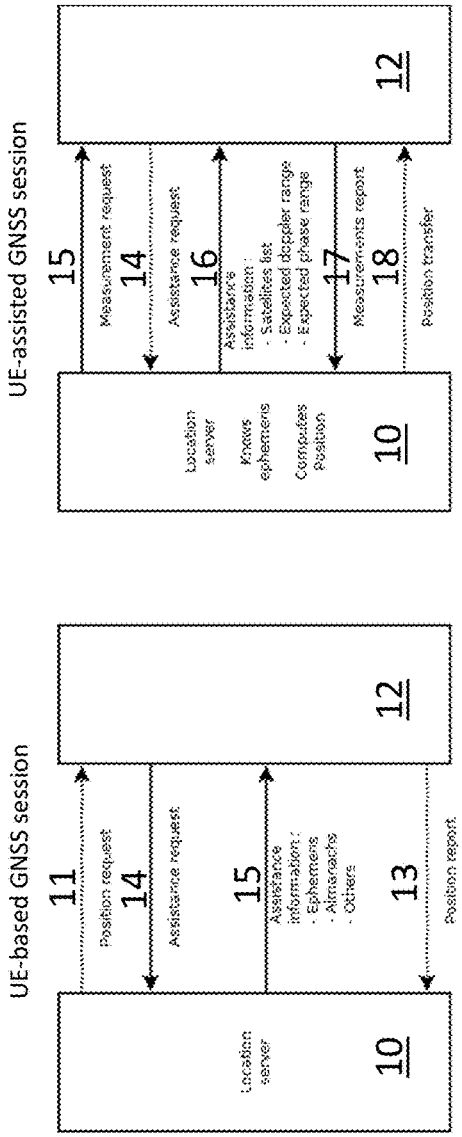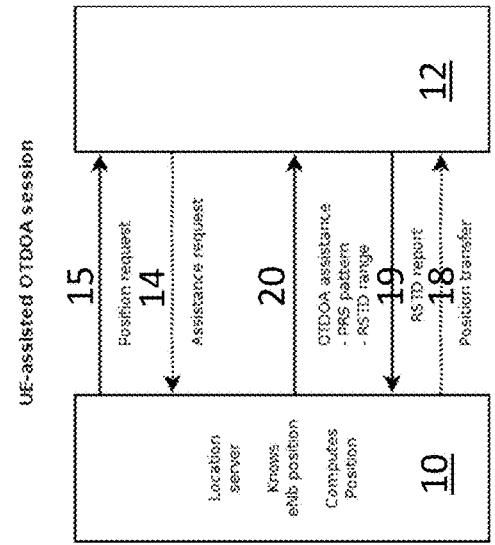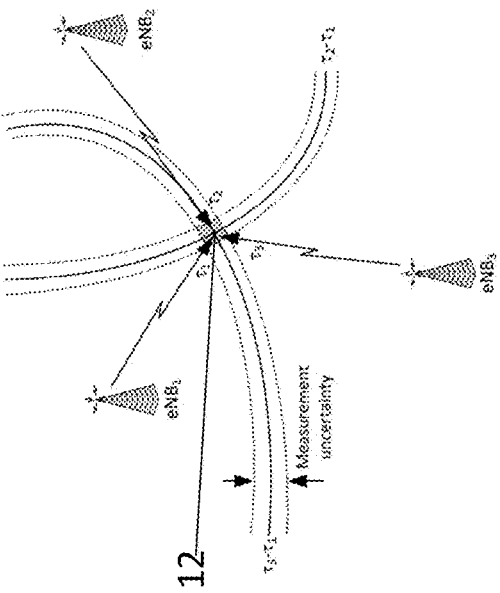

MESSAGING SCHEME FOR POSITIONING

RELATED APPLICATION

This application claims priority under 35 U.S.C. § 119 or 365 to EP Application No. 16305385.3, filed Mar. 31, 2016. The entire teachings of the above application are incorporated herein by reference.

BACKGROUND

The LTE standard is capable of providing services for device positioning wherein the position of User Equipment (UE) in the network, such as a mobile device, can be determined. The network comprises a location server for the provision of information to assist in position determination and/or to compute the device position.

Calculation of the device position can be divided into two classes:

In the first class, known as UE-based, the UE computes its own position and reports the position to the location server. The location server may provide the UE with information (known as assistance data) to improve the positioning accuracy or reduce the time taken to determine position by the UE.

In the second class, known as UE-assisted, the UE does not compute its own position but performs measurements that are used by the location server to compute the UE position. The network may provide assistance data to ease the measurement undertaken by the UE.

For both classes, communication between the location server and the UE takes place using well defined exchanges of message(s).

Initiation of positioning may be:

Network initiated: the network requests the UE position. This occurs, for instance, during an emergency session after a user has dialed 911 in the US.

UE initiated: the UE wants to know its position: this occurs for instance when a user is using its device to know its location.

In 3GPP systems, the positioning system relies on:

3 positioning technologies

Global navigation satellite system (GNSS), observed time difference of arrival (OTDOA) and enhanced cell ID (ECID). In known systems, GNSS may operate in both UE-based and UE-assisted classes, while OTDOA and ECID are UE-assisted only.

The LTE positioning protocol (LPP) and/or secure user plane location (SUPL) standards for the communications protocol.

These protocols define how the location server and the UE communicate to exchange information related to positioning.

GNSS

GNSS is a technology that is well known to work in a UE based way (for instance in a car) but it can also work in a UE assisted way.

When UE-based, the UE computes the propagation delay in relation to the GNSS satellites in view and also decodes the signals transmitted by the satellites to retrieve satellite position (the ephemeris). The acquisition time for the ephemeris is typically at least 18 s and can be much longer (several minutes). Therefore, schemes have been defined to assist computation by the UE. For example, the network can provide ephemeris information to the UE to reduce the acquisition time significantly (to a few seconds). Further, almanacs may be provided to avoid the GNSS receiver of the UE having to search for satellites in vain (for example if a satellite is broken and therefore not providing GNSS information).

When UE-assisted, the UE simply measures the propagation delay of a list of satellites provided by the network. The UE knows the GNSS satellites propagation delay but not the ephemeris and therefore only the network can compute the position. In addition, the network may provide to the UE the expected phase and Doppler range of each satellite. This aids the UE to reduce the satellite search space and hence reduce the time taken to make the measurements of the satellites propagation delays.

Drawbacks of GNSS Positioning

FIG. 1 summarizes a typical GNSS positioning session in 3GPP for UE-based calculation. FIG. 2 summarizes a typical GNSS positioning session in 3GPP for UE-assisted calculation. In all figures, optional message exchanges are depicted using dashed arrows.

UE-based GNSS Positioning:

In FIG. 1, when the UE (12) computes its position, the UE may decide to carry out the calculation on its own without a position request (11) from the location server (10). The UE may also omit to report its position to the server (13).

Drawbacks in the case of UE-based GNSS positioning:

The UE must transmit an assistance request message (14) before receiving assistance data (15). This will cause energy consumption by the UE. An example where this assistance request is mandatory is when the GNSS device on the UE wants to compute its position on its own without a location server request (11).

If the UE is not connected, it will first need to establish LTE connectivity before being able to transmit the assistance request. This will cause further energy consumption as several messages have to be exchanged between the local eNB and the UE to establish an LTE connection as would be understood.

UE-assisted GNSS Positioning

In FIG. 2, in UE-assisted positioning, subsequent to a measurement request (15), the location server (10) may send assistance data (16) before an assistance request (14) from the UE (12) in which case an assistance request (14) will not be requested by the UE (12). When a UE-assisted session finishes, the location server may or may not transmit the computed position to the UE (18).

Drawbacks in the case of UE-assisted GNSS positioning:

The assistance information (16) must be provided to the UE and hence may cause energy loss at the UE if assistance information is not transmitted spontaneously by the network. This is generally the case if the location session is network initiated but in this case the device may not know its own position at the end of the session. If the session is initiated by the UE, then it will necessary request assistance (14) which will consume energy to transmit the corresponding message. This use case can be used to offload the complex position computation from the UE to the server or to perform fewer measurements at the UE and speed up the measurement duration owing to use of the assistance information.

For both UE-based and UE-assisted GNSS schemes, the following drawbacks are evident:

Assistance information is always unicast (sent to a unique UE) while it could be broadcast to all the UEs within a cell. For instance the ephemeris could be broadcast to all the UEs within a cell (as the satellite positions are absolute and independent of the cellular network).

Assistance information is sent for each positioning session even if the assistance information has not changed (for example the ephemeris can last typically around a couple of hours while almanac can be valid for several days).

Assistance information wastes energy if the UE has to request it.

OTDOA

OTDOA is a technology that has been introduced with LTE. It can provide more accurate positioning compared to GNSS, and it has the advantage of being able to work seamlessly indoors and outdoors (while GNSS is known to face issues with indoor or urban environments). OTDOA is a technology that works only in a UE-assisted way in 3GPP.

OTDOA Operates as Follows:

The eNB sends positioning pilot signals, known as PRS (positioning reference signal) inside the LTE radio signal according to a defined pattern (period and position of the PRS).

The PRS can be used by the UE (12) to measure the relative propagation delay between the eNB and the UE with good accuracy, known as RSTD (reference signal time difference).

When a positioning session occurs, the location server (10) provides the list of eNB sending PRS in the vicinity of the UE (12) as well as the PRS patterns that are used by each eNB. The location server also provides to the UE, an estimate and expected window for the propagation delay for each eNB. That way, the UE can measure the RSTD around this estimate using a reduced search window and hence save processing resources. All this information is known as OTDOA assistance and it is mandatory for the UE to perform the RSTD estimation.

The RSTD information is reported to the location server.

The location server knows the eNB position and can then estimate the UE position (12) through hyperbolic equations using the relative time difference $\tau 3$-$\tau 1$ and $\tau 2$-$\tau 1$ as illustrated in FIG. 3 (picture from document "Observed Time Difference Of Arrival (OTDOA) Positioning in 3GPP LTE" by Sven Fisher—Jun. 6, 2014—Qualcomm.

Drawbacks of OTDOA

Typical OTDOA positioning session in 3GPP is summarized in FIG. 4.

In known systems, OTDOA works only in a UE-assisted way. The UE only reports RSTD measurements (19) and cannot compute its own position as this would require knowledge of the position of the eNodeBs.

The drawbacks of such a scheme:

Assistance information (20) is mandatory for OTDOA positioning resulting in the drawbacks listed in the next paragraph.

The UE is unable to compute its own position which prevents some use cases. For instance, OTDOA positioning cannot be used to replace GNSS on a watch for runners.

The device must use energy to transmit the RSTD report (19).

The assistance scheme has 2 additional drawbacks:

Assistance information is always unicast while the PRS and expected RSTD with the maximum RSTD uncertainty could be broadcast to all UEs in a cell (the uncertainty modeling the variation of the RSTD per UE)

Assistance information is sent for each positioning session even if the assistance information has not changed.

The sending is, therefore, frequently redundant information as the assistance information is not expected to change unless the UE has moved significantly since the last positioning session occurred or the last positioning that occurred is so old that it is safer to refresh it. For instance, the resending of assistance data could be limited to:

Each time the UE has carried out a handover to a new cell

Or less frequently, each time the UE experiences a change of tracking area

As would be understood, a tracking area is a group of cells, each cell corresponding to an eNodeB. All eNodeB within a tracking area are connected to a single MME (Mobility Management Entity) which is a server connected to all eNB of the tracking area. MMES are interconnected together to ensure calls continuity and tracking of the UE.

Communication Protocol Used for Positioning

The protocols used for positioning in 3GPP are:

The LTE positioning protocol (LPP).

Secure user plane location (SUPL) and non-access stratum (NAS) protocol for the transport layer.

The LPP protocol is a protocol dedicated to positioning that is defined in LTE Positioning Protocol (LPP) (3GPP TS 36.355)—ETSI TS 136 355 V11.2.0 (2013 April). Relevant parts of LPP are described herein as appropriate.

SUPL and NAS are considered, without restricting the scope of this disclosure. The disclosure applies equally to both SUPL and NAS or any other transport protocol. SUPL and NAS are considered as transport layer, without restricting the scope of this disclosure. NAS is one layer of the control plane in LTE. It is mostly used as any other control plane layer to define how transmission occurs and to establish the user plane flow. A NAS message typically contains a description of the transmission flow. However, NAS also has the capability to convey information messages which can be for instance SMS or LPP messages. NAS acts in this case as a transport protocol and if the message is an LPP message, this is what is usually called LPP over control plane (a.k.a. LPP over NAS). On the other hand, information messages (including Internet messages) are generally transferred on the user plane (i.e. at the Internet protocol (IP) level). This is specifically the case when LPP is transmitted in a SUPL session. This is usually called LPP over the user plane or LPP over SUPL.

LPP is a positioning protocol that operates on a per positioning session basis as shown in FIG. 5. Each time a position/positioning measurement is required, a new LPP session is started. This session will happen either:

At the user plane level (above IP) using the SUPL protocol as a transport layer.

At the control plane level using the NAS as a transport layer.

In both cases, the UE has to be in connected mode so that the LPP exchanges can take place.

With reference to FIG. 5, and without any loss of generality, a positioning session typically operates as follows when the session is initiated by the location server:

The location server (10) sends a request to the UE (12) to provide its measurement capabilities, i.e., the positioning technologies it supports (51).

The UE answers the server request by providing its capabilities (52).

Then, the actual positioning phase starts.

Location server provides assistance information (53) to the UE which can be:

OTDOA assistance information

GNSS assistance information for UE-based session (for example ephemeris, almanacs, etc)

GNSS assistance information for UE-assisted session (satellites to measure with ranges for satellite phase and Doppler search)

Location server then requests the location information (54).

UE answers the server requests and provides either the measurements and/or the position (55).

The session is ended.

When the positioning session is initiated by the UE, the session typically occurs as follows:

UE may provide its capabilities spontaneously.

UE requests assistance information.

UE may provide location information to the server or keep it for its own use.

The session is ended

In addition to the messages of FIG. 5, the LPP protocol also supports duplicate detection, message acknowledgements, retransmissions, error handling, and abort procedures. This additional functionality can increase the number of exchanged messages between the location server and the UE (downlink and uplink).

Problems to be Solved

Battery Life

Power consumption is important in most embedded systems as it will directly determine the battery life of, for example, a UE. For UEs performing positioning, the power consumption will depend mostly on:

The intrinsic power consumption of the positioning technique (OTDOA, GNSS, etc. . . . ) which mostly depends on the duration to acquire the positioning signals and compute the measurements or position.

The number of downlink and uplink messages received and sent during the positioning session. It is noted that uplink transmission from a UE requires much more energy than receiving a downlink message.

Therefore, it is desirable to reduce the number of messages dealt with by the UE when performing positioning calculations.

SUMMARY

This disclosure relates to the provision of positioning data. It is particularly suitable for, but by no means limited to, providing LTE positioning data to enable more efficient global navigation satellite system (GNSS) and OTDOA positioning calculations. The disclosure may be extended to any communication protocol that has a positioning method. In particular the underlying novelties can be extended to NB-IoT (which is an evolution of LTE for the internet of things), Sigfox, Lora and other cellular protocols.

According to a first aspect there is provided a method of providing position assistance to a UE as defined in Claim 1 of the appended claims. Thus there is provided a method comprising providing, by a location server, at least one unsolicited message, each message comprising one of data selected from a list comprising: GNSS ephemeris assistance data, GNSS acquisition assistance data, OTDOA assistance data, and eNB position data for a predefined area.

According to a second aspect there is provided a method of receiving position assistance at a UE as defined in Claim 2 of the appended claims. Thus there is provided a method comprising receiving, at a UE, at least one unsolicited message, each message comprising one of data selected from a list comprising GNSS ephemeris assistance data, GNSS acquisition assistance data, OTDOA assistance data, and eNB position data for a predefined area.

Optionally, the ephemeris assistance data comprises ephemeris data, time data and/or almanac data.

Optionally, the GNSS acquisition assistance data comprises expected phase and/or Doppler ranges.

Optionally, the OTDOA assistance data comprises a list of eNB, associated PRS pattern and/or expected RSTD range.

Optionally, the eNB position data comprises eNB position data of an area adjacent or surrounding an LTE cell.

Optionally, the eNB position data comprises position data of an area adjacent or surrounding a cell of a wireless communications network and/or a base station of a wireless communications network.

Optionally, the eNB position data comprises eNB position data of an area adjacent or surrounding a cell or base station of a wireless communications network; and optionally wherein the cell or base station is an LTE cell or base station.

Optionally, the GNSS ephemeris assistance data and the GNSS acquisition assistance data is provided in two unsolicited messages.

Optionally, the OTDOA assistance data and the eNB position data is provided in two unsolicited messages.

Optionally, the at least one unsolicited message is provided on an LTE control plane or user plane.

Optionally, the at least one unsolicited message is broadcast per LTE cell.

Optionally, the at least one unsolicited message is broadcast to each UE attached to an eNB.

Optionally, each of the at least one unsolicited message comprises a system information block 'SIB' message.

Optionally, the at least one unsolicited message comprises a first SIB message type.

Optionally, the at least one unsolicited message comprises a second SIB message type.

Optionally, the at least one unsolicited message comprises a third SIB message type.

Optionally, the at least one unsolicited message comprises a fourth SIB message type.

Optionally, the at least one unsolicited message further comprises reliability data defining a reliability of the message data.

Optionally, the reliability data is indicative of a period of time when the at least one unsolicited message data can be considered reliable.

Optionally, the reliability data comprises a geographical area of applicability of the at least one unsolicited message data.

Optionally, the at least one unsolicited message is encrypted.

Optionally, the method further comprising providing a public key to a UE recipient of the at least one unsolicited message.

Optionally, the at least one unsolicited message is unicast on a non access stratum 'NAS' layer.

Optionally, the at least one unsolicited message comprises a UDP datagram.

Optionally, position assistance is provided for a GNSS position calculation.

Optionally, position assistance is provided for an OTDOA position calculation.

Optionally, the position assistance is provided to an LTE UE without requiring the UE to be attached to an LTE network.

Optionally, the position assistance is received at an LTE UE without requiring the UE to be attached to an LTE network.

According to a third aspect there is provided a computer readable medium comprising instructions that cause a processor to carry out the method of any of the aspects.

According to a fourth aspect there is provided a processor arranged to perform instructions to carry out the method of any of aspects.

According to a fifth aspect there is provided an eNB comprising a processor according to the fourth aspect.

According to a sixth aspect there is provided a UE comprising a processor according to the fourth aspect.

According to a seventh aspect there is provided a cell or base station comprising a processor according to the fourth aspect.

According to an eighth aspect there is provided a cell or base station comprising a processor according to the fourth aspect.

With all the aspects, preferable and optional features are defined in the dependent claims.

Also disclosed herein:

A broadcasting scheme for transmission of shared positioning assistance messages to each UE attached to an eNB.

In the case of LTE, the scheme comprises sending several useful positioning assistance messages as new SIB messages.

A first SIB carrying ephemeris assistance message. Usage of the first SIB by avoiding assistance request to reduce the power consumption when the GNSS device works in a UE-based way.

A second SIB carrying GNSS acquisition assistance message. Usage of the first and second SIB to fasten the acquisition duration without assistance request when the GNSS device works in a UE-based way.

A third SIB carrying OTDOA assistance message. A fourth SIB carrying the position of the eNBs in the cell vicinity. Usage of the third and fourth SIB to perform UE-based OTDOA positioning without sending assistance request.

Usage of part or all of the SIBs to save bandwidth of the cell by broadcasting common information rather than sending it per UE.

A unicast scheme comprising sending the message contents as described in relation to the SIBs in an unsolicited way at the NAS level.

A security scheme consisting in encrypting the SIB content using a private key, sending a public key to the UE so that it can compute the SIB private key using the public key and its own secrete key.

Also provided is time and/or geographical information to define the validity of the broadcasted scheme and avoid the UE continuously listening to the broadcast SIBs.

The methods described herein may be applied equally to any protocol providing a way to broadcast messages. This may be any wireless communication protocol. SIB is one example of providing broadcast messages (in LTE).

Any reference to eNB herein can also be taken as cell or base station of a wireless communications network. Any reference to UE can also be taken as a UE of a wireless communications network.

BRIEF DESCRIPTION OF THE DRAWINGS

Embodiments will now be described, by way of example only, and with reference to the drawings in which:

FIG. 1 illustrates a typical GNSS positioning session in 3GPP for UE-based calculation;

FIG. 2 illustrates a typical GNSS positioning session in 3GPP for UE-assisted calculation;

FIG. 3 illustrates estimation of UE position through hyperbolic equations;

FIG. 4 illustrates a typical OTDOA positioning session in 3GPP;

Figures 5, 6:
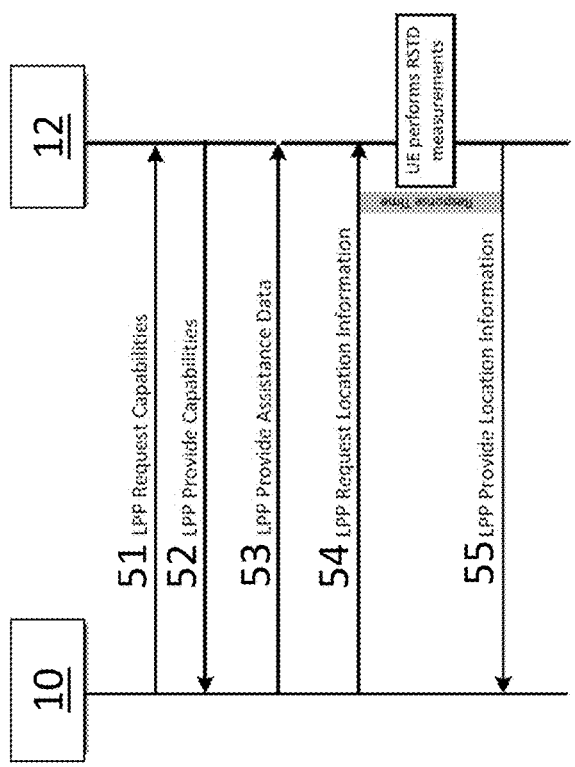
FIG. 5 illustrates a typical LPP positioning session.
FIG. 6 illustrates a generic message container that can be used for a NAS level unsolicited message.

In the figures, like elements are indicated by like reference numerals throughout. The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

An improved method is provided for transmitting and receiving unsolicited position assistance messages to improve positioning in 3GPP. That is to say that the unsolicited messages are sent without being requested.

One or more of the following unsolicited messages are broadcast per LTE cell:

1. GNSS ephemeris assistance for UE-based positioning—message type 1.

For example GNSS ephemeris, time, almanac information. The message content is based on the time of the day, if, as in the GNSS signal, the ephemeris contains the orbital parameters of all satellites of the GNSS system. Typically, not all satellites are in view simultaneously and only part of the ephemeris can be transmitted using the approximate position of the network cell in question to determine which satellites are visible.

2. GNSS acquisition assistance for UE-assisted positioning—message type 2.

For example expected phase and Doppler ranges of GNSS satellite signals. The message content is based on the time of the day as well as the approximate position of the network cell in question. That is to say that the expected phase and Doppler ranges of satellites can be computed from the approximate position of the network cell and from the ephemeris (a set of parameters to compute satellite position knowing the time of the day).

3. OTDOA assistance—message type 3.

For example a list of eNBs with associated PRS pattern and expected RSTD range for the cell. The message content is based on the network configuration of the serving cell in question and of the other LTE cells surrounding the serving cell.

4. OTDOA assistance—message type 4.

The positions of the eNBs for a predefined area, typically an area surrounding the cell of the UE. Typically the position of eNBs advertised in Message Type 3 is provided so that they can be used in the equation to determine the UE position.

The improved method may be implemented in several ways:
(A) Introduction of new unsolicited system information block (SIB) message(s) for LTE or more generally of new unsolicited broadcast messages.
(B) Unsolicited assistance information reception at the control plane level (LPP over NAS) or at the user plane level (LPP-SUPL). The concepts mentioned herein can be applied to other positioning protocols or applications operating above the IP layer.
(C) Unsolicited user datagram protocol (UDP) datagrams at the application level above IP.

(A) New Unsolicited SIB Messages

A system information block (SIB) message is a broadcasting scheme used in LTE to allow an eNB to broadcast information to all UEs. Both UEs that are not yet connected to the LTE network but listening to the radio signals (known as UE in IDLE) and UEs that are connected to the network are able to receive the SIBs. Many SIBs are defined in LTE. Any particular UE is not required to decode all SIBs. Only SIBs of interest (SIB1 and SIB2) have to be decoded:

SIB1 defines the other SIBs broadcast by the eNB.
SIB1 and SIB2 define the essential cell configuration to allow the UE to establish connectivity.

Other SIBs may or may not be decoded depending on the UE usage. As an example, the 3GPP/LTE standard defines SIB13 when TV broadcast is executed on the cell to provide to the UEs, information as to how the TV frames should be decoded. A UE that has no need to receive TV will simply avoid decoding this particular SIB (SIB13).

Further, SIB1 comprises a flag to notify a UE that the other SIBs have changed. This way, the UE has to reacquire a SIB only if it has changed (or if the UE has changed the serving cell either after a handover or after a loss of service).

In line with the four message types described above, four new SIBs are defined:
SIBpos1 for message type 1
SIBpos2 for message type 2
SIBpos3 for message type 3
SIBpos4 for message type 4

The 'pos' identifier is defined to differentiate between known SIBs. Any nomenclature could be used. SIBpos1 allows a UE to receive ephemeris without wasting any energy for requesting assistance. As the ephemeris is broadcast and hence shared between all the UEs in a cell, the operator will save bandwidth as the ephemeris no longer needs to be sent per UE positioning device and positioning session. Further, this also allows an LTE+GNSS UE to receive the ephemeris without having established LTE connectivity. A UE in idle mode is able to receive SIBs which will help to save energy further (the network does not even need to be notified that the UE is listening to the broadcast messages).

SIBpos2 allows a UE to reduce satellite acquisition time as expected phase and Doppler ranges are provided. This can result in energy saving as the acquisition phase is shortened.

Note that on top of this information, the GPS time may be useful assistance information to improve the performance of a GNSS receiver. This information exists in a SIB in LTE (SIB16). This information may be included into the message type 1 or 2 or both.

SIBpos3 allows the broadcasting of OTDOA assistance and hence to share the assistance between all UEs in a network cell. Operator bandwidth may be saved as the OTDOA assistance is no longer needed per positioning device (UE). This also reduces UE power usage by avoiding redundant reception of assistance data by the UE when it is known that the assistance data has not changed since it was last provided to the UE.

SIBpos4 allows OTDOA receivers (UEs) to compute their own positions which avoids the necessity to waste energy to transmit RSTD measurements (see FIG. 9) to the server to get a position.

SIBpos3 and SIBpos4 may be used jointly. This allows performance of OTDOA positioning at the UE (UE-based) even without LTE connectivity. Previously, such calculations were prohibited by the UE not being able to calculate its own position. The UE simply has to listen to the LTE signal, but does not need to be connected to the LTE network.

Message Content

The message contents can take any appropriate form with several possible degrees of assistance. For instance, the content can correspond to the assistance messages defined in document 3GPP 36.355. The open mobile alliance (OMA) defines such messages in specifications OMA-TS-ULP-V2_0_1-20121205-A—"UserPlane Location Protocol"—5 Dec. 2012—Author Open Mobile Alliance and OMA-TS-LPPe-V2_0-20141202-C—"LPP Extensions Specification"—2 Dec. 2014—Author Open Mobile Alliance.

SIBpos1 may contain messages that are based on or similar to those described in document 3GPP 36.355 in sections 6.5.2.1 and 6.5.2.2 and related to ephemeris (and almanacs). The most relevant messages are GNSS-NavigationModel for Ephemeris, GNSS-Reference time for time of the day, GNSS-Almanac for the Almanac SIBpos2 may contain messages that are based on or similar to those described in sections 6.5.2.1 and 6.5.2.2 related to GNSS-Acquisition Assistance.

SIBpos3 may contain messages that are based on or similar to those described in section 6.5.1.1 and 6.5.1.2. For example at least part of the content of the otdoa_ReferenceCellInfo and otdoa-NeighbourCellInfo messages for the cells surrounding the serving cell.

SIBpos4 may contain messages that are based on or similar to those described in OMA-TS-LPPe-V2_0 related to the eNodeBs positions.

Reliability of SIB Messages

Power consumption at a UE may also be reduced by avoiding the UE listening continuously to a SIB if the content of that SIB has not changed since it was last detected by that UE.

Any or all of the SIBpos1, 2, 3, 4 messages may comprise reliability data indicative of or defining a reliability of content of the SIBpos message. The reliability data may define conditions until when the SIB content can be considered as reliable and hence the UE not needing to listen to the SIB again.

The reliability data may comprise:
Validity duration—typically useful for ephemeris
Geographical area of applicability—typically useful for OTDOA
A combination validity duration and area of applicability.

Encryption of SIB Messages

In the case of OTDOA, a network operator may be reluctant to broadcast the position of its eNB as well as the pattern location (message types 3 and 4) in an open format.

Accordingly, user (UE) authorization may be provided by way of the following steps:

eNB broadcasts one or several SIB to all the UEs in the cell where the SIBs have been encrypted using a private positioning key. Therefore a UE needs this private positioning key to be able to decode the SIB.

When a user is authorized to use the new SIB-based service, the eNB will send to a UE a public positioning key that is specific to that UE.

The public positioning key cannot be used directly to decode the broadcast SIB. It is specific to the UE in question, and is used in conjunction with private decode key(s) stored on the subscriber identity module (SIM) of the UE, although this disclosure is not limited to SIM and may apply to any scheme used to store and access the private key). For instance the key can be stored on a flash memory or directly inside the device hardware.

To be able to retrieve the private positioning key to be able to decode the SIBs, the UE needs to use the public positioning key and the private decode key(s) stored on its SIM to derive the private positioning key.

Other appropriate encryption mechanisms may be used to ensure that the unsolicited SIB broadcast messages are not in an open format.

(B) New NAS Level Unsolicited Messages

The network (a part of it comprised in the location server) may send unsolicited messages from time to time using NAS as a transport layer to provide unsolicited assistance information to a UE. The messages may be sent, for example, as periodic transmissions or at a handover or tracking area change. The location server provider may determine when messages may be sent.

Using NAS level messages is less efficient in terms of cell capacity than the new SIB broadcasting described previously as the transmission to each UE would be unicast. However, unsolicited assistance information messages at the NAS level allow the avoidance of unnecessary assistance request/exchanges through the LPP protocol so some part of the broadcasting scheme gain still remains.

A new NAS message type for the generic message container is introduced. For example, see FIG. 6 which illustrates that message 00000011 may be used to send unsolicited assistance messages to the UE where the data content of the four message types as previously described can be transmitted to a UE. Any such (currently) unused NAS message may be used for a NAS message for positioning as described above.

(C) New Unsolicited UDP Datagrams

UDP is a known transport protocol on top of IP. A location server can send unsolicited UDP datagrams to a UE connected to an IP network. In the case of a UE connected to an IP network, a location server can send unsolicited assistance information (any of the four message types) to the UE to provide assistance as was previously explained in the NAS case. Instead of being done in the control plane, the assistance is sent in the form of IP packets over the user plane. One way to do so is to send an unsolicited UDP packet to the UE containing the assistance information. If, for some reason, a user plane communication channel at the IP layer has already been established, then the server can decide to send either an UDP or TCP packet.

Benefit for a GNSS Positioning System

Figures 7, 8:
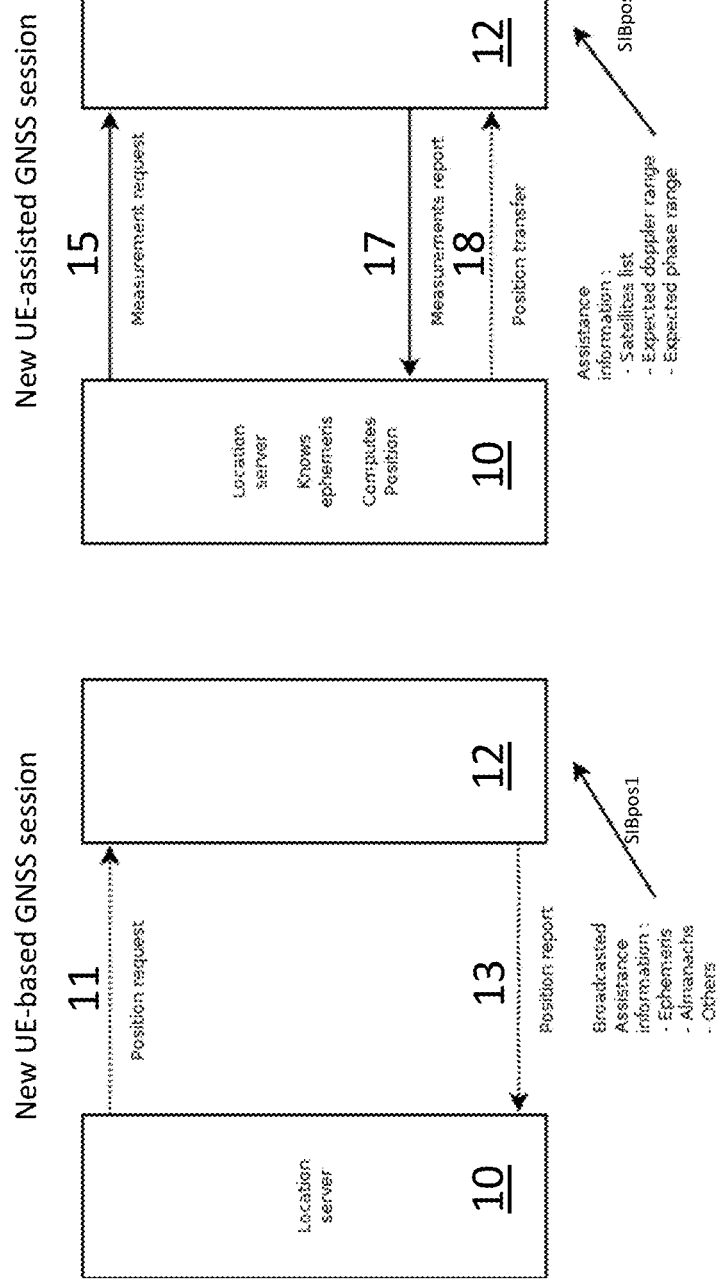
FIG. 7 illustrates the benefit derived from the new method described herein for a GNSS positioning system (legacy UE-based)
FIG. 8 illustrates the benefit derived from the new method described herein for a GNSS positioning system (legacy UE-assisted)
Figure 9:
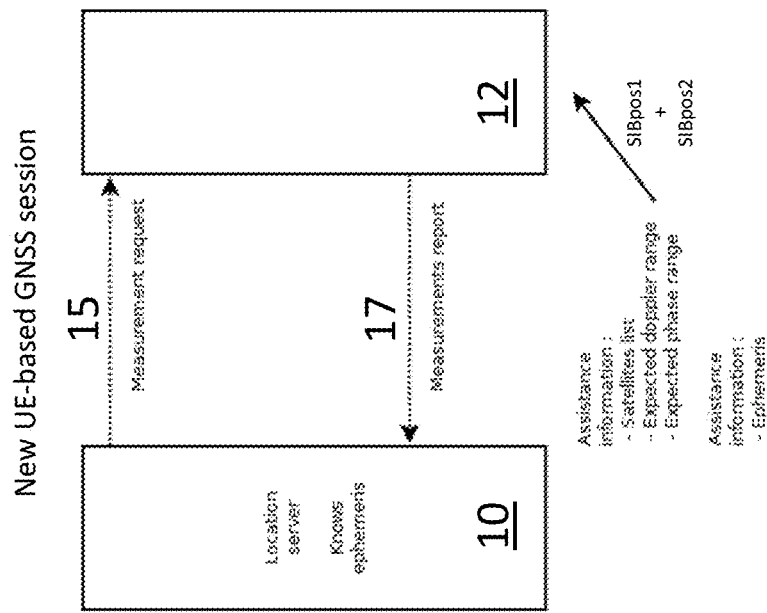
FIG. 9 illustrates the benefit derived from the new method described herein for a GNSS positioning system (new UE-based)

FIGS. 7, 8 and 9 illustrate the benefit derived from the new method described herein for a GNSS positioning system.

In a legacy UE-based session (FIG. 1), the assistance request from the UE (see 14 of FIG. 1) is avoided owing to the new UE-based session (SIBpos1) as depicted in FIG. 7 which increases UE battery life significantly. In a legacy UE-assisted GNSS session (FIG. 2), the position assistance information (see 16 of FIG. 2) is provided through the broadcast SIB when SIBpos2 is used, resulting in the session depicted in FIG. 8, reduced data transfer and network connectivity results in network bandwidth saving.

If SIBpos1 and SIBpos2 are used together (FIG. 9), the UE is able to estimate its position in a much faster way owing to having ephemeris and almanac information (and potentially any other additional information of message types 1 and 2) without needing to establish network connectivity and with reduced communication messages to and from the UE resulting in reduced power consumption.

By way of comparison between FIGS. 2 and 9, the number of messages is reduced from 4 or 5 down to 2:

FIG. 7 compared to FIG. 1:

Assistance request (14) is never requested as SIBpos1 is always available

Assistance information (15) is no longer sent in the LPP session but broadcast through SIBpos1.

FIG. 8 compared to FIG. 2:

Assistance request (14) is never requested as SIBpos2 is always available

Assistance information (16) is no longer sent in the LPP session but broadcast through SIBpos2.

FIG. 9:

If both SIBpos1 and SIBpos2 are used, potentially the new method can work without LPP at all. This is useful, for instance, in a connected watch.

Benefit for an OTDOA Positioning System

Figures 10, 11:
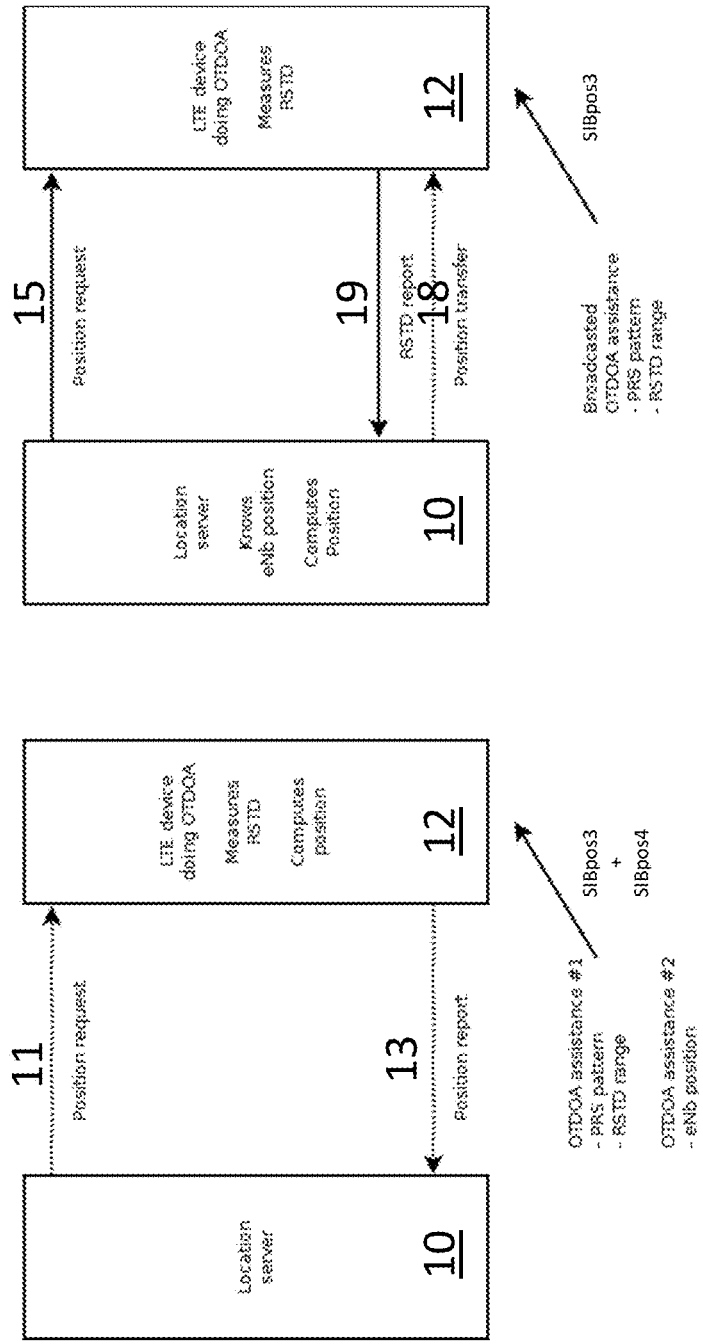
FIG. 10 illustrates the benefit derived from the new method described herein for an OTDOA positioning system (new UE-based)
FIG. 11 illustrates the benefit derived from the new method described herein for an OTDOA positioning system (new UE-assisted).

FIGS. 10 and 11 illustrate the benefit derived from the new method described herein for an OTDOA positioning system.

In a UE-based session (FIG. 10), the efficiency gain is huge as potentially, the UE does not need to communicate with the network.

In a UE-assisted session (FIG. 11), the efficiency gain is at system level for a network initiated positioning session: bandwidth is saved as assistance information is shared between UEs in a cell. For a UE initiated positioning, the gain is that the UE saves some energy as it does not have to request the assistance.

By way of comparison between FIGS. 11 and 4:

Assistance request (14) is never requested as SIB3pos is always available.

OTDOA Assistance information (20) is no longer sent in the LPP session but broadcast through SIB3pos.

Further, the UE is able to compute its own position opening the door to new use cases. In FIG. 10, using SIBpos3 and SIBpos4, the UE can compute its position on his own. Rather than a GNSS watch, OTDOA watches are now possible.

In FIG. 10, the UE can compute its position and may transfer its position to the network (dashed as it is optional). For the particular use case, if the location server does not need to know the US position, then no more messages are required.

In summary, the benefits of the new method include:

Reduction in the power consumption of the UE when carrying out both GNSS and OTDOA positioning by reducing the number of messages transmitted from and received by a UE when performing positioning. For example, it is not necessary to exchange capabilities (FIG. 5, 51 and 52) for each positioning session as this information can be stored in the location server and reused to avoid wasting power and bandwidth.

Reduction in network operator bandwidth by sharing assistance and positioning information among the UEs of a cell (broadcasting to many UEs) rather than sending the information in a unicast manner.

Allowing new usages and use cases for both GNSS and OTDOA positioning, for example a running watch using OTDOA or an indoor tracker using OTDOA.

A processor may be programmed or comprise instructions to carry out any of the methods as described herein. The processor may be part of an eNB or a UE of an LTE network. A computer readable medium may be provided, the computer readable medium comprising instructions that cause a processor to carry out any of the methods described herein.

What is claimed is:

1. A method of providing position assistance to a UE, the method comprising:
    providing, by a location server, at least one unsolicited message, each message comprising one of data selected from a list comprising:
        GNSS ephemeris assistance data;
        GNSS acquisition assistance data;
        OTDOA assistance data; and
        eNB position data for a predefined area;
    wherein the at least one unsolicited message further comprises reliability data defining a reliability of the message data wherein the reliability data is indicative of a period of time when the at least one unsolicited message data can be considered reliable; and wherein the reliability data comprises a geographical area of applicability of the at least one unsolicited message data.

2. The method of claim 1 wherein the ephemeris assistance data comprises ephemeris data, time data and/or almanac data.

3. The method of claim 1 wherein the GNSS acquisition assistance data comprises expected phase and/or Doppler ranges.

4. The method of claim 1 wherein the OTDOA assistance data comprises a list of eNB, associated PRS pattern and/or expected RSTD range.

5. The method of claim 1 wherein the eNB position data comprises eNB position data of an area adjacent or surrounding a cell or base station of a wireless communications network; and optionally wherein the cell or base station is an LTE cell or base station.

6. The method of claim 1 wherein the at least one unsolicited message is provided on an LTE control plane or user plane.

7. The method of claim 1 wherein the at least one unsolicited message is broadcast per LTE cell.

8. The method of claim 7 wherein the at least one unsolicited message is broadcast to each UE attached to an eNB.

9. The method of claim 1 wherein the position assistance is provided to an LTE UE without requiring the UE to be attached to an LTE network.

10. A method of receiving position assistance, the method comprising:
    receiving, at a UE, at least one unsolicited message, each message comprising one of data selected from a list comprising:
        GNSS ephemeris assistance data;
        GNSS acquisition assistance data;
        OTDOA assistance data; and
        eNB position data for a predefined area;
    wherein the at least one unsolicited message further comprises reliability data defining a reliability of the message data wherein the reliability data is indicative of a period of time when the at least one unsolicited message data can be considered reliable; and wherein the reliability data comprises a geographical area of applicability of the at least one unsolicited message data.

11. The method of claim 10 wherein the ephemeris assistance data comprises ephemeris data, time data and/or almanac data.

12. The method of claim 10 wherein the GNSS acquisition assistance data comprises expected phase and/or Doppler ranges.

13. The method of claim 10 wherein the OTDOA assistance data comprises a list of eNB, associated PRS pattern and/or expected RSTD range.

14. The method of claim 10 wherein the eNB position data comprises eNB position data of an area adjacent or surrounding a cell or base station of a wireless communications network; and optionally wherein the cell or base station is an LTE cell or base station.

15. The method of claim 10 wherein the at least one unsolicited message is provided on an LTE control plane or user plane.

16. The method of claim 10 wherein the at least one unsolicited message is broadcast per LTE cell.

17. The method of claim 16 wherein the at least one unsolicited message is broadcast to each UE attached to an eNB.

18. The method of claim 10 wherein the position assistance is provided to an LTE UE without requiring the UE to be attached to an LTE network.

* * * * *